UNITED STATES PATENT OFFICE.

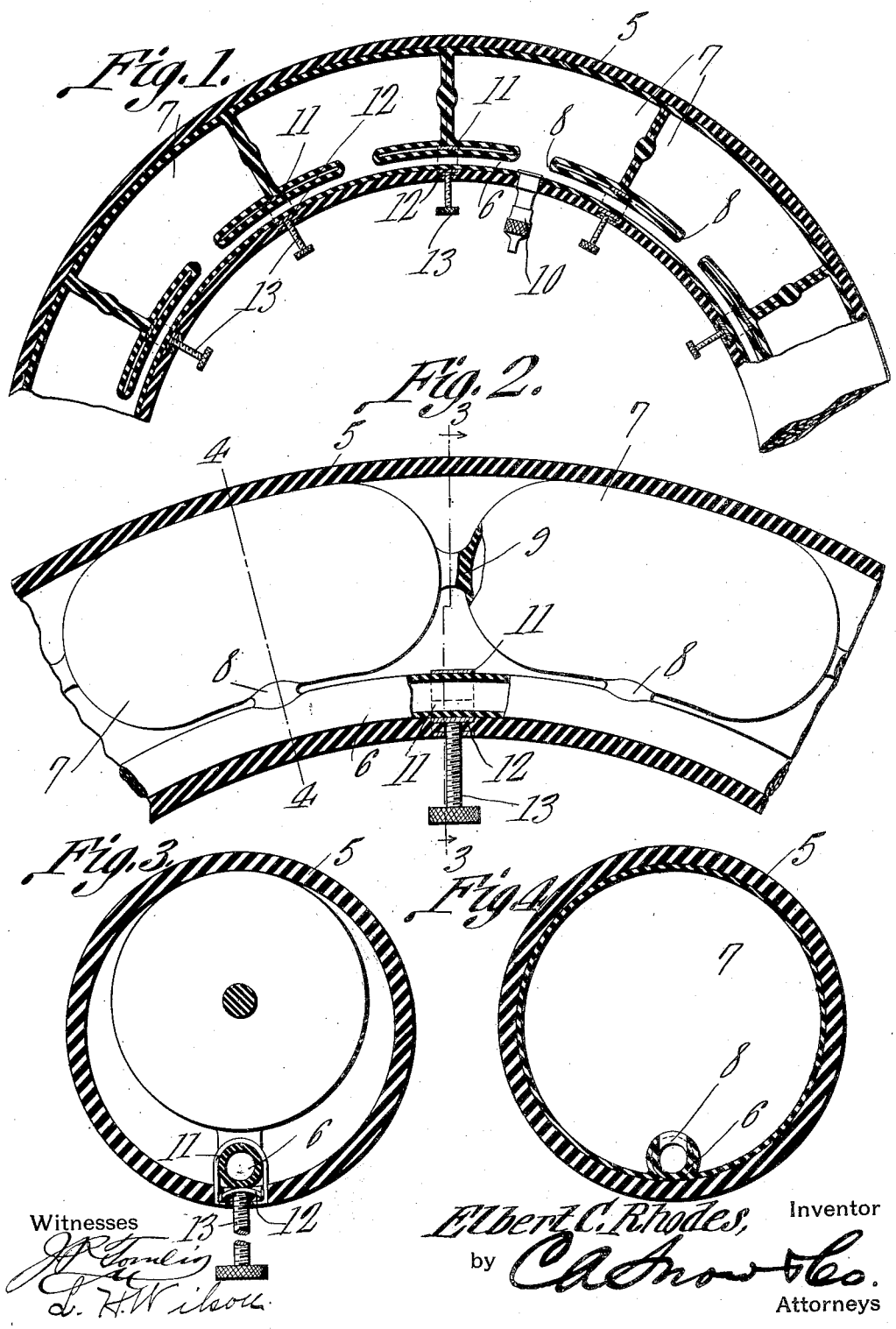

ELBERT CHARLES RHODES, OF CHICAGO, ILLINOIS.

TIRE.

1,057,580.  Specification of Letters Patent.  Patented Apr. 1, 1913.

Application filed February 16, 1911. Serial No. 608,922.

*To all whom it may concern:*

Be it known that I, ELBERT C. RHODES, a citizen of the United States, residing at Chicago, in the county of Cook and State of Illinois, have invented a new and useful Tire, of which the following is a specification.

It is the object of the present invention to provide a pneumatic tire so constructed that it may be punctured a number of times before becoming deflated to such a degree as to be useless. It has been proposed, in order to secure this result, to provide a tire consisting of an outer tube and a plurality of inflatable air chambers arranged therewithin and usually these air chambers are independently inflatable. As a result, some of the chambers will be inflated to a greater or less degree than others and the tire will be hard in some spots and soft at others.

The present invention therefore aims to provide for simultaneous inflation of all of the air chambers to the same degree although, when the tire has been completely inflated and other means is manipulated, the air chambers are out of communication and a puncture of any one thereof will not affect any others of the chambers.

In the accompanying drawings, Figure 1 is a vertical sectional view through a portion of a tire constructed in accordance with the present invention. Fig. 2 is a similar view in detail illustrating the tire partly inflated. Fig. 3 is a sectional view on the line 3—3 of Fig. 2. Fig. 4 is a section on the line 4—4 of Fig. 2, showing the tire completely inflated.

In the drawings, the tire embodying the present invention is illustrated as consisting in part of an outer tube 5 within which is arranged the inflatable member of the tire. The inflatable member consists of a continuous air conduit or supply tube 6 and a plurality of inflatable air chambers 7 which communicate with the conduit 6 by way of air ports 8. It is preferable that the air conduit be located inwardly of the series of air chambers 7 and it is also preferable that the air chambers be connected in a continuous series as at 9. An inflating valve 10 communicates with the air conduit 6 and extends through the inner side of the outer tube 5 and to this valve may be connected an ordinary bicycle tire pump for the purpose of forcing air into the conduit. The air thus supplied to the conduit will be in turn admitted to the inflatable chambers 7 and these chambers will in this manner be simultaneously inflated to the same degree.

It will be understood from the foregoing that at the time of the inflation of the tire, all of the air chambers 7 are in communication with the air conduit 6 and consequently are in communication with each other, indirectly. However, it is expedient that some means be provided for closing the air conduit between the chambers so that should any one of the chambers become punctured, none of the other chambers will be affected.

The means for closing the air conduit mentioned above, is preferably constructed as shown in the drawings and is in the nature of a clamp comprising a band 11 which fits about the air conduit, one of these bands being located between each two air chambers 7, is embedded at its inner end in the outer tube 5. Mounted to work in this band is a follower 12 and a clamping screw 13 is threaded through the said end of the band and bears against the follower, whereby, when the screw is turned in one direction, the follower will be caused to compress the portion of the air conduit embraced by the band. Thus, when the tire has been properly inflated, all of the screws 13 are tightened whereby to close the air conduit between each two air chambers 7 so that puncture of any one or several of these chambers will not affect any others.

What is claimed is:—

A tire comprising a sheath, a plurality of inflatable compartments permanently connected at their ends and arranged therein, an air tube communicating with all of the compartments, an inflating valve carried by the tube, and means for cutting off communication between the tube and any one or more of the compartments.

In testimony that I claim the foregoing as my own, I have hereto affixed my signature in the presence of two witnesses.

ELBERT CHARLES RHODES.

Witnesses:
 ROY E. DODGE,
 J. S. MARTIN.

Copies of this patent may be obtained for five cents each, by addressing the "Commissioner of Patents, Washington, D. C."